(12) United States Patent
Han

(10) Patent No.: US 10,669,929 B1
(45) Date of Patent: Jun. 2, 2020

(54) VARIABLE COMPRESSION RATIO ENGINE

(71) Applicants: HYUNDAI MOTOR COMPANY, Seoul (KR); KIA MOTORS CORPORATION, Seoul (KR)

(72) Inventor: Kyoung Chan Han, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/391,970

(22) Filed: Apr. 23, 2019

(30) Foreign Application Priority Data

Dec. 10, 2018 (KR) .................. 10-2018-0158664

(51) Int. Cl.
  *F02B 75/04* (2006.01)
  *F02D 15/04* (2006.01)
  *F02D 13/02* (2006.01)
  *F02M 26/01* (2016.01)
  *F01L 13/00* (2006.01)
  *F01L 1/344* (2006.01)

(52) U.S. Cl.
  CPC .......... *F02B 75/042* (2013.01); *F01L 1/344* (2013.01); *F01L 13/0005* (2013.01); *F02D 13/0276* (2013.01); *F02D 15/04* (2013.01); *F02M 26/01* (2016.02)

(58) Field of Classification Search
  CPC ................ F02B 75/042; F02D 15/04
  USPC ....................................... 123/48 R
  See application file for complete search history.

(56) References Cited

U.S. PATENT DOCUMENTS

| | | | | |
|---|---|---|---|---|
| 2,890,688 A * | 6/1959 | Goiot | ...... | F02D 15/04 123/48 D |
| 5,101,776 A * | 4/1992 | Ma | ...... | F02D 15/04 123/48 D |
| 6,135,086 A * | 10/2000 | Clarke | ...... | F02B 1/04 123/316 |
| 8,286,597 B2 * | 10/2012 | Yaoita | ...... | F01B 31/14 123/188.4 |

FOREIGN PATENT DOCUMENTS

KR    1020110043978    4/2011

* cited by examiner

*Primary Examiner* — Kevin A Lathers
(74) *Attorney, Agent, or Firm* — Lempia Summerfield Katz LLC

(57) ABSTRACT

A variable compression ratio engine includes an extra chamber formed at a cylinder head, an extra valve being able to open/close the extra chamber, and an actuator being able to open/close the extra chamber by driving the extra valve.

7 Claims, 5 Drawing Sheets

VARIABLE COMPRESSION RATIO ENGINE

CROSS REFERENCE TO RELATED APPLICATION

The present application claims priority to Korean Patent Application No. 10-2018-0158664, filed on Dec. 10, 2018, the entire contents of which is incorporated herein for all purposes by this reference.

BACKGROUND

1. Field of the Disclosure

The present disclosure relates to a reciprocating internal combustion engine and, more particularly, to the configuration of a variable compression ratio engine.

2. Description of the Prior Art

A reciprocating internal combustion engine is configured to generate torque by reciprocating a piston using pressure generated in a combustion chamber. A compression ratio is the ratio of a clearance volume when the piston is at the top dead center and a cylinder volume when the piston is at the bottom dead center. Compression ratio has a large influence on the thermal efficiency of the internal combustion engine.

An increase in compression ratio of an engine usually improves thermal efficiency. However, an excessive compression ratio causes knocking, deteriorates the mechanical durability of the engine, increases a pumping loss in of a gasoline internal combustion engine, and increases the temperature of a combustion chamber, thereby increasing the amount of exhaust gas NOx in a diesel internal combustion engine.

Accordingly, it is preferable that an engine can appropriately change the compression ratio in accordance with operation situations.

The description provided above as related art of the present disclosure is to help understand the background of the present disclosure and should not be construed as being included in the related art known by those having ordinary skill in the art.

SUMMARY

The present disclosure is made in order to solve the above-mentioned problems in the prior art. An aspect of the present disclosure is to provide a variable compression ratio engine that can secure high thermal efficiency, reduce a pumping loss, and reduce nitrogen oxides by changing a compression ratio in accordance with operation situations thereof, when desired or deemed needed.

In view of the above aspect, a variable compression ratio engine may include an extra chamber formed at a cylinder head, an extra valve that is able to open/close the extra chamber, and an actuator that is able to open/close the extra chamber by driving the extra valve.

The extra valve may have a valve stem extending upward from the cylinder head through the extra chamber. The extra valve may have a return spring that applies elasticity in a direction in which the extra valve closes the extra chamber. The return spring may be disposed between the extra valve and the cylinder head. The actuator may press a stem end of the extra valve so that the extra valve can open the extra chamber against the elasticity of the return spring.

The actuator may include an extra camshaft having a cam pressing the stem end of the extra valve. The actuator may include a deactivation member that is able to switch states in which the deactivation member transmits and does not transmit displacement generated by the cam of the extra camshaft to the stem end of the extra valve. The extra camshaft may be operated with a valve camshaft.

The cam of the extra camshaft may have a shape with two noses radially protruding in a circular cross-section such that the extra valve is opened and closed once per two strokes of a piston.

A phase changer may be disposed on the extra camshaft. The phase changer can change the rotational phase of the extra camshaft with respect to the valve camshaft. The phase changer may be controlled by a controller that adjusts the rotational phase of the extra camshaft in accordance with operation situations of the engine.

The controller may control the phase changer such that the extra valve opens the extra chamber during a compression stroke and an exhaustion stroke of the engine in order to reduce the compression ratio of the engine.

The controller may control the phase changer such that the extra valve opens the extra chamber between an explosion stroke and an exhaust stroke and between an intake stroke and a compression stroke of the engine in order to increase an internal exhaust gas recirculation (EGR) amount of the engine.

In an operation situation of the engine in which it is not required to open/close the extra chamber, the controller may control the deactivation member not to transmit displacement generated by the cam of the extra camshaft to the stem end of the extra valve.

According to the present disclosure, it is possible to secure high thermal efficiency, reduce a pumping loss, and reduce nitrogen oxides by changing a compression ratio in accordance with operation situations thereof, when desired or if deemed necessary.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS

Figure 1:
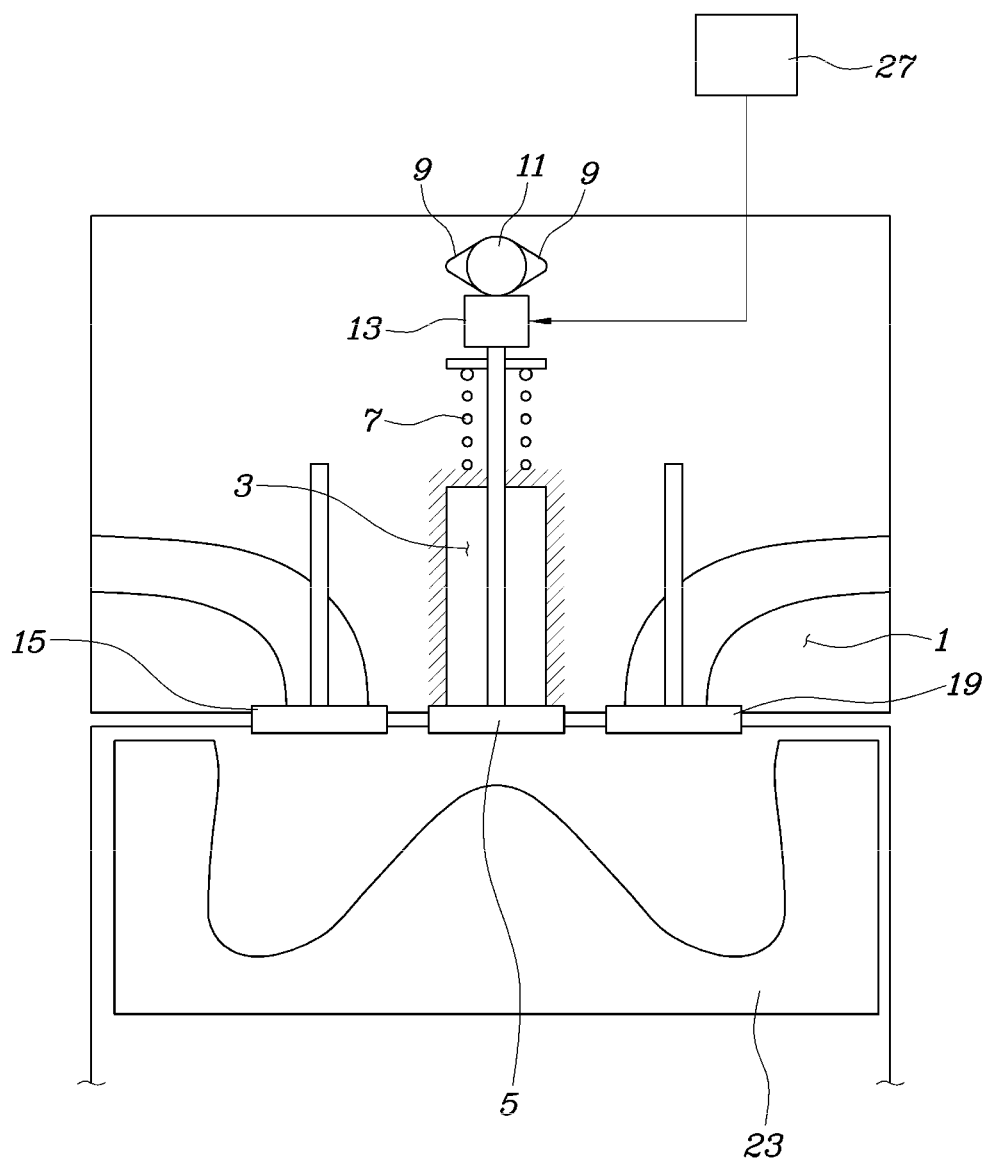
FIG. 1 is a cross-sectional view showing a variable compression ratio engine of the present disclosure.
Figure 2:
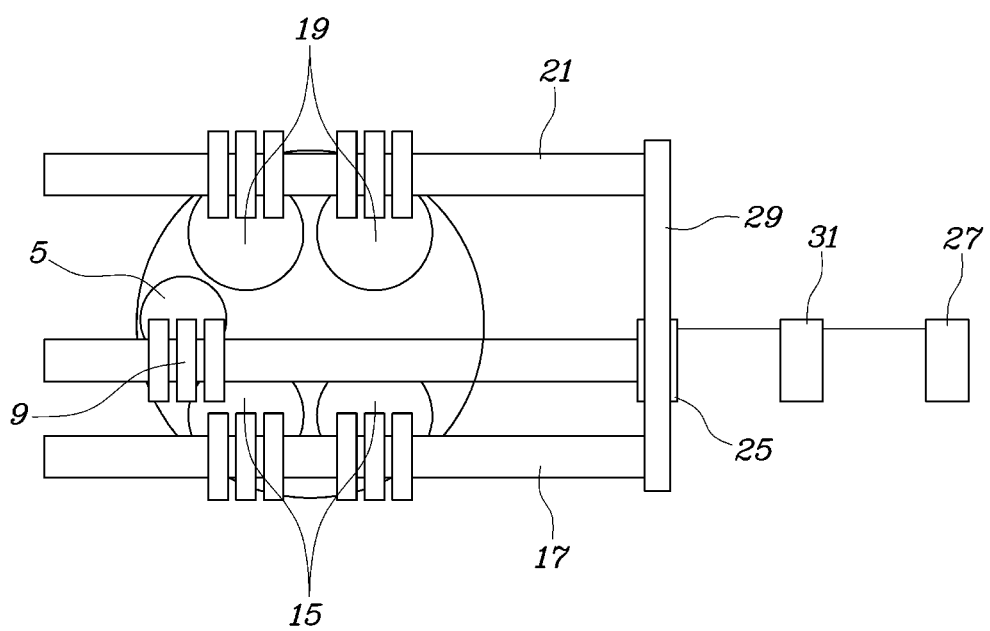
FIG. 2 is a plan view of the engine shown in FIG. 1.

Referring to FIGS. 1 and 2, an embodiment of a variable compression ratio engine of the present disclosure engine includes an extra chamber 3 formed at a cylinder head 1, an extra valve 5 that is able to open/close the extra chamber 3, and an actuator that is able to open/close the extra chamber 3 by driving the extra valve 5.

According to the engine of the present disclosure, the extra chamber 3 is a separate space that is formed at the cylinder head 1. The compression ratio of the engine can be substantially changed by opening/closing the extra chamber 3 with the extra valve 5, depending on the operation situations of the engine.

In this embodiment, the extra valve 5 has a valve stem extending upward from the cylinder head 1 through the extra chamber 3. The extra valve has a return spring 7 that applies elasticity in the direction in which the extra valve 5 closes the extra chamber 3. The return spring is disposed between the extra valve 5 and the cylinder head 1. The actuator presses the stem end of the extra valve 5 so that the extra valve 5 can open the extra chamber 3 against the elasticity of the return spring 7.

Further, in this embodiment, the actuator includes an extra camshaft 11 having a cam 9 pressing the stem end of the extra valve 5. The actuator includes a deactivation member 13 that is able to switch states in which it transmits or does not transmit displacement generated by the cam 9 of the extra camshaft 11 to the stem end of the extra valve 5. The extra camshaft 11 is operated with a valve camshaft.

The deactivation member 13 may employ any suitable mechanisms that are used to deactivate a cylinder in the related art of cylinder deactivation engines such that an intake valve and an exhaust valve are not driven by an intake cam and an exhaust cam. For example, a cam follower structure or the like, disposed between a cam and a valve step, may be used to switch states in which displacement of a cam is or is not transmitted electrically or hydraulically to the stem end of a valve.

The valve camshaft is composed of an intake camshaft 17 for opening/closing intake valves 15 and an exhaust camshaft 21 for opening/closing exhaust valves 19. As shown in FIG. 2, three camshafts are disposed over the cylinder head 1 in this embodiment.

The cam of the extra camshaft 11 has a shape with two noses radially protruding in a circular cross-section such that the extra valve 5 is opened and closed once per two strokes of a piston 23.

Accordingly, the extra valve 5 is opened and closed once per one-time rotation or revolution of a crankshaft of the engine.

The extra camshaft 11 may be configured to be operated with the crankshaft of the engine by power transmitted to the crankshaft through a chain or a belt, may be configured to be operated with the valve camshaft by a gear, or the like.

A phase changer 25 is disposed on the extra camshaft 11 and can change the rotational phase of the extra camshaft 11 with respect to the valve camshaft. The phase changer 25 is controlled by a controller 27 that adjusts the rotational phase of the extra camshaft 11 in accordance with the operation situations of the engine.

The phase changer 25 may be a hydraulic actuator of the like that is used for a Continuous Variable Valve Timing (CVVT) device in the related art to advance or retard the rotational phase of a valve camshaft with respect to a crankshaft.

For reference, FIG. 2 shows a configuration in which, not only the intake camshaft 17 and the exhaust camshaft 21, but also the extra camshaft 11, are operated together by a timing chain 29. The timing chain 25 transmits power from the crankshaft of the engine. The phase changer 25 is disposed between the timing chain 29 and the extra camshaft 11 so that the rotational phase of the extra camshaft 11 can be changed by driving the phase changer 25 using a hydraulic device 31 that is controlled by the controller 27.

Figure 4:
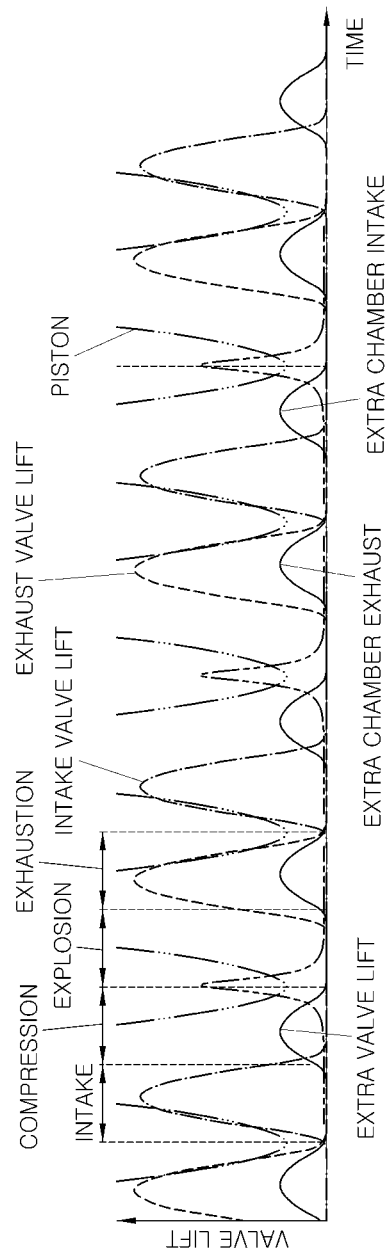
FIG. 4 is a graph showing a situation in which the engine of the present disclosure reduces a pumping loss by decreasing a compression ratio, using valve lifts of valves over time.

The controller 27 controls the phase changer 25 such that the extra valve 5 opens the extra chamber 3 during a compression stroke and an exhaustion stroke of the engine, as shown in FIG. 4, in order to reduce the compression ratio of the engine.

When the extra valve 5 is opened in the compression stroke of the engine, some of the air or a gas mixture that is compressed by the piston 23 in a combustion chamber moves to the extra chamber 3 while the piston 23 moves toward top dead center. The compression ratio is decreased by substantially the same effect that a clearance volume is increased.

Further, as described above, when the compression ratio is decreased by opening the extra valve 5, the piston 23 receives substantially less resistance when moving during the compression stroke. Thus, the piston 23 consumes less energy for the compression stroke, thereby obtaining an effect that reduces a pumping loss of the engine.

In order to increase the internal EGR amount of the engine, the controller 27 controls the phase changer 25 such that the extra valve 5 opens the extra chamber 3 between an explosion stroke and an exhaust stroke and between an intake stroke and a compression stroke of the engine.

When the extra valve 5 is opened in the latter part of the explosion stroke of the engine, some of combustion gas is moved and stored in the extra chamber 3. Then, when the extra valve 5 is opened in the middle and latter half part of the intake stroke of the next cycle, the exhaust gas stored in the extra chamber 3 is mixed with new intake air in the combustion chamber. This causes so-called "INTERNAL EGR EFFECT".

The internal EGR described above reduces production of nitride oxides by decreasing a combustion temperature of the combustion chamber.

In an operation situation of the engine in which it is not required to open/close the extra chamber 3, the controller 27 controls the deactivation member 13 to not transmit displacement generated by the cam 9 of the extra camshaft 11 to the stem end of the extra valve 5.

Accordingly, in situations, except for the situations in which the compression ratio and pumping loss of the engine are reduced or it is required to induce internal EGR, as described above, displacement generated by the cam of the extra camshaft 11 is not transmitted to the stem end of the extra valve 5 by the deactivation member 13. Thus, the extra chamber 3 is prevented from being opened/closed. Accordingly, the engine is operated in the same way as common engines of the related art.

Figure 3:
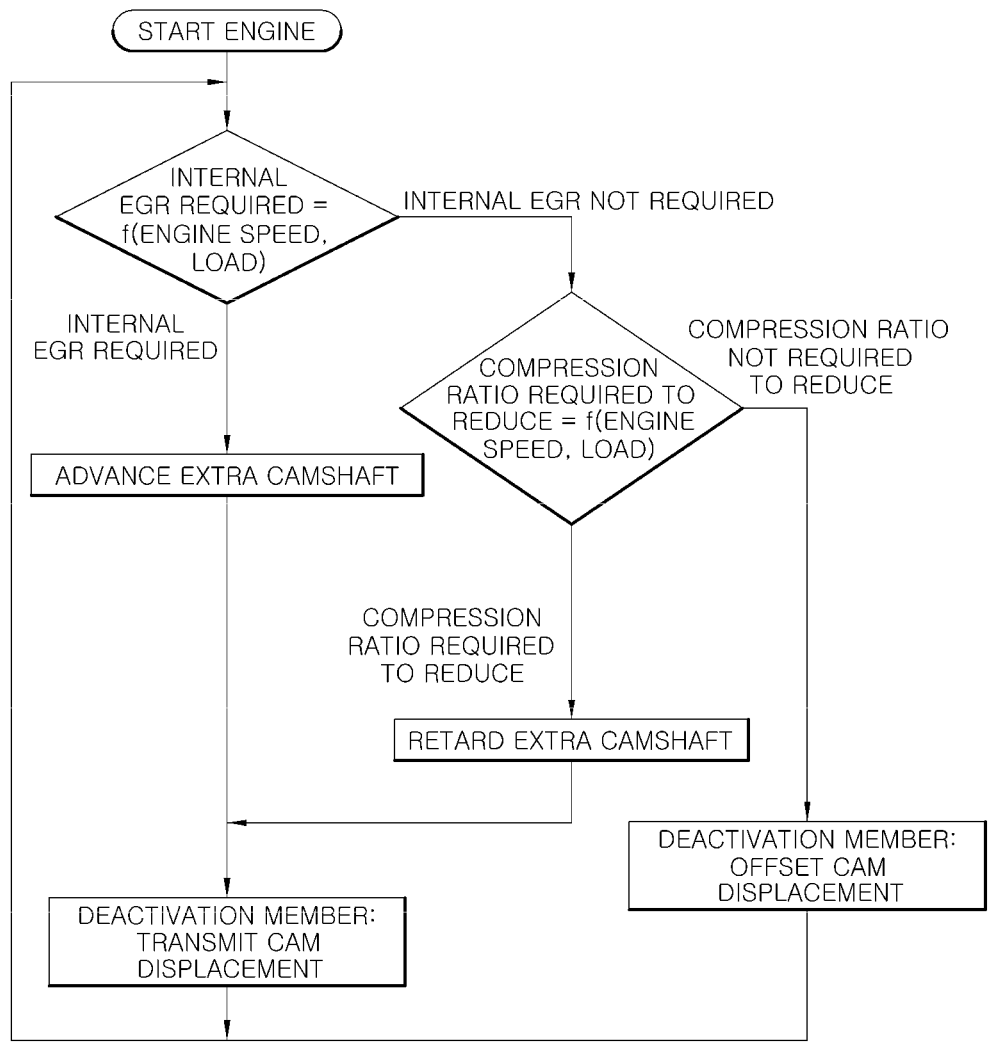
FIG. 3 is a flowchart showing an embodiment that controls a variable compression ratio engine of the present disclosure.
Figure 5:
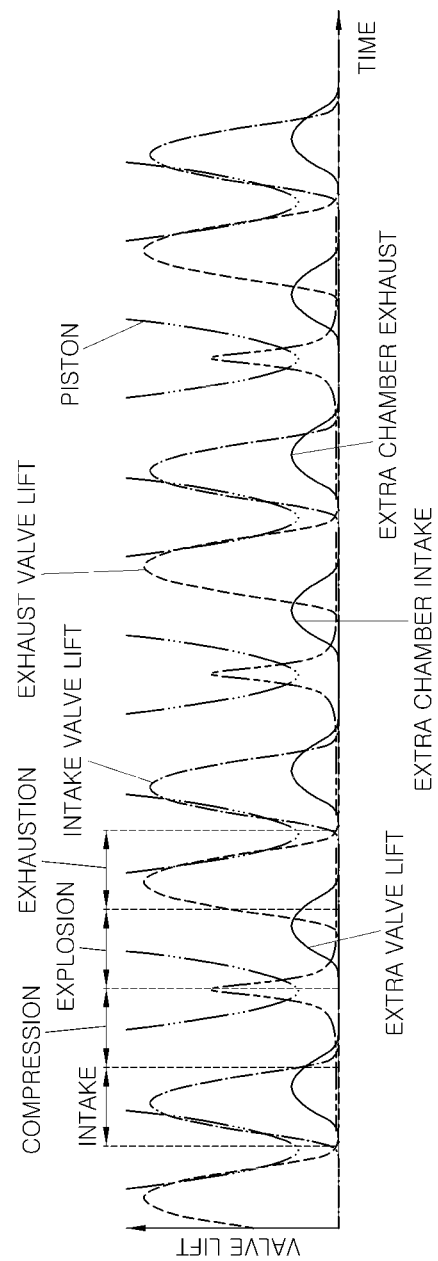
FIG. 5 is a graph showing a situation in which the engine of the present disclosure increases the internal EGR amount, using valve lifts of valves over time.

FIG. 3 is a view showing the operation of the variable compression ratio engine of the present disclosure. When the controller 27 determines that internal EGR is required due to an engine speed, a load, or the like, the controller 27 drives the phase changer 25 to open/close the extra valve with the phase shown in FIG. 5 by advancing the extra camshaft 11. When determining that internal EGR is not required and it is required to reduce the compression ratio, the controller 27 retards the extra camshaft 11 using the phase changer 25 such that the extra valve 5 is driven with the phase shown in FIG. 4. In this case, the deactivation member 13 transmits displacement of the cam of the extra camshaft 11 to the extra valve 5 such that the extra valve 5 is opened and closed in the states shown in FIGS. 4 and 5.

On the contrary, when the controller 27 determines that it is not required to reduce the internal EGR and the compression ratio, the controller 27 offsets displacement of the cam of the extra camshaft 11 through the deactivation member 13 such that the extra valve 5 is not opened/closed.

The present disclosure is described with reference to specific embodiments shown in the drawings. However, it will be apparent to those having ordinary skill in the art that the present disclosure may be changed and modified in various ways without departing from the scope of the present disclosure, which is described in the following claims.

What is claimed is:

1. A variable compression ratio engine comprising:
   an extra chamber formed at a cylinder head;
   an extra valve being able to open/close the extra chamber; and
   an actuator being able to open/close the extra chamber by driving the extra valve,
   wherein the extra valve has a valve stem extending upward from the cylinder head through the extra chamber, wherein a return spring, which applies elasticity in a direction in which the extra valve closes the extra chamber, is disposed between the extra valve and the cylinder head, and wherein the actuator presses a stem end of the extra valve so that the extra valve can open the extra chamber against the elasticity of the return spring.

2. The variable compression ratio engine of claim 1, wherein the actuator includes:
   an extra camshaft having a cam pressing the stem end of the extra valve; and
   a cam deactivation member being able to switch states in which the cam deactivation member transmits and does not transmit displacement generated by the cam of the extra camshaft to the stem end of the extra valve, and
   wherein the extra camshaft is operated with a valve camshaft.

3. The variable compression ratio engine of claim 2, wherein the cam of the extra camshaft has a shape with two noses radially protruding in a circular cross-section such that the extra valve is opened and closed once per two strokes of a piston.

4. The variable compression ratio engine of claim 3, wherein an extra camshaft phase changer, which can change the rotational phase of the extra camshaft with respect to the valve camshaft, is disposed on the extra camshaft; and
   wherein the extra camshaft phase changer is controlled by a controller that adjusts the rotational phase of the extra camshaft in accordance with operation situations of the engine.

5. The variable compression ratio engine of claim 4, wherein the controller controls the extra camshaft phase changer such that the extra valve opens the extra chamber during a compression stroke and an exhaust stroke of the engine in order to reduce the compression ratio of the engine.

6. The variable compression ratio engine of claim 4, wherein the controller controls the extra camshaft phase changer such that the extra valve opens the extra chamber between an explosion stroke and an exhaust stroke and between an intake stroke and a compression stroke of the engine in order to increase an internal exhaust gas recirculation (EGR) amount of the engine.

7. The variable compression ratio engine of claim 4, wherein, in an operation situation of the engine in which it is not required to open/close the extra chamber, the controller controls the cam deactivation member not to transmit displacement generated by the cam of the extra camshaft to the stem end of the extra valve.

\* \* \* \* \*